United States Patent Office 3,081,323
Patented Mar. 12, 1963

3,081,323
FUNGICIDES AND THEIR PRODUCTION
Arthur Greth and Johannes Reese, Wiesbaden-Biebrich, Germany, assignors to Chemische Werke Albert, Wiesbaden-Biebrich, Germany, a corporation of Germany
No Drawing. Filed Oct. 9, 1959, Ser. No. 845,309
Claims priority, application Germany Dec. 2, 1958
7 Claims. (Cl. 260—429)

This invention relates to a process for producing improved fungicides and to the resulting product.

Various salts of ethylene bis-dithiocarbamic acid, including the heavy metal salts, are known to be fungicidal and are commercially available under such names as Zineb and Maneb. In accordance with United States Patent No. 2,317,765, the heavy metal salts are produced in a two step process involving first the production of the water soluble salts by reacting ethylene diamine with carbon disulfide in an aqueous medium in the presence of a strong base such as sodium hydroxide. Then the water soluble salts are converted into water insoluble heavy metal salts by metathesis involving reacting the water soluble intermediate salt with water soluble salts of the heavy metals such as heavy metal chlorides or sulfates of zinc. In the production of these heavy metal salts by-product inorganic salts, typically sodium chloride, are produced and are precipitated together with the insoluble heavy metal organic salts. Separation of these inorganic salts from the heavy metal organic fungicide is difficult and as a result a considerable amount normally remains in the fungicide where it has a tendency to exert a phytotoxic effect when the fungicide is applied to plant life. Also, in such reactions, other impurities are frequently present such as salts of trithiocarbonic acid, or other sulfur compounds, which may impair the stability and the odor of the fungicide.

Now it has been found that an improved fungicide can be produced by a simpler and much more direct process namely, a fungicide having the fungicidal properties of the prior art compounds disclosed above without their impurities. In accordance with this invention, ethylene diamine and carbon disulfide are directly reacted with zinc oxide or manganous oxide or their mixtures without the necessity of going through the two step process of the prior art. In this way, insoluble, or difficultly soluble, salts are obtained directly from the liquid reaction medium and can be easily filtered therefrom and dried into a fine readily suspendable powder.

The reactions of this invention have been attempted by using various molar ratios of the reactants. An analysis of the reaction products has shown, however, that salts of ethylene bis-dithiocarbamic acid are not produced but rather salts of beta-aminoethyl dithiocarbamic acid are produced even though large molar excess of carbon disulfide are used per mol of ethylene diamine. In other words, instead of producing compounds of the prior art having the following formula:

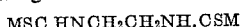

compounds are produced which are considered to be represented by the formula:

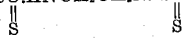

where Z represents a salt forming metal derived from zinc oxide, manganous oxide or mixtures of such oxides. These latter salts are produced even though carbon disulfide is used in large amounts for it has not been found possible under the conditions of the direct reaction to induce more than 1 mol of carbon disulfide to react with a mol of ethylene diamine.

It has been surprisingly found that zinc oxide or manganous oxide, which are themselves insoluble in water, can be converted into the water insoluble organic salt by stirring the zinc oxide, or manganous oxide or their mixtures, into an aqueous solution of the ethylene diamine and introducing into this aqueous mixture carbon disulfide. By proceeding in this manner, the process of the prior art is not only simplified but the sodium hydroxide and the hydrochloric acid and their equivalents, which are necessary in the prior art process, are saved while one obtains a very pure product which is free of impurifying inorganic salts and does not contain other impurities.

Since by the direct reaction of this invention it has not been found to be possible to induce more than 1 mol of carbon disulfide to react with 1 mol of ethylene diamine, the reaction is customarily carried out by using about 1 to 2, and preferably about 1.1, mols of carbon disulfide per mol of ethylene diamine. Large quantities of carbon disulfide would serve no useful purpose and would merely tend to contaminate the reaction medium.

On the other hand, it is possible to vary the quantity of metal oxide over a considerable range and yet obtain products having excellent fungicidal properties. More particularly, it has been found that good fungicides can be obtained by utilizing from 0.5 to 1.5 mols of the zinc oxide, or manganous oxide, or equivalent molar quantities of the two, per mol of ethylene diamine. It is considered that when an excess of the heavy metal oxide is used per mol of ethylene diamine, complex salts are formed. Thus for instance by reacting 1.0 mols of zinc oxide, one mol of ethylene diamine and one mol of carbon disulfide a salt has been obtained whose analysis indicates a complex salt of one mol of beta-aminoethyl dithiocarbamic acid and one mol of zinc oxide or zinc hydroxide. It was established that the resulting product was not a mere mixture of zinc oxide with the zinc salt of beta-aminoethyl dithiocarbamic acid for it was not possible to obtain any worthwhile quantities of zinc acetate by reaction with 50% acetic acid by slight warming as would be the case if zinc oxide were present.

Thus, basically, the instant process is a very simple one. Typically the metal oxide is stirred into an aqueous solution of ethylene diamine in a molar ratio of amine to oxide of between 1:0.5 and 1:1.5 and then 1 to 2, preferably 0.9 to 1.2 mols of carbon disulfide, are added whereby an exothermic reaction takes place so that the reaction mass should eventually be cooled. The reaction can be carried out at temperatures between 20–50° C. but it is most advantageously carried out at temperatures between 30–40° C. The reaction mixture should be stirred vigorously throughout the reaction period in order to bring the insoluble zinc oxide into close contact with the water soluble reactant. The amount of water can be varied within wide limits but it is usually adjusted so that the reaction mixture may be suitably stirred for appropriate contact between the reactants and so that the reaction mass may be maintained at an appropriate reaction temperature. Customarily 400–600 ml. of water per mol of ethylene diamine is used. Larger quantities of water can be used. Soon after the beginning of the reaction, a very thick paste tends to form and this must be thoroughly stirred to maintain contact. After a period of time, depending to a certain extent upon the volume of water, the viscous paste is converted into an easily stirrable precipitate. Once the reaction product is formed, the water may be easily separated from the reaction product by suction or centrifuging and the reaction product then can be dried in the reaction chamber or by spray-drying. The reaction product obtained is in the form of a fine, slightly yellowish powder.

The powdery reaction product obtained in the reaction of this invention may be easily mixed with an emulsifier, inert carriers, substances inducing adhesion to plants or other insecticidal or fungicidal substances. Where necessary, or desirable, fungicides of this invention can be mixed with its carrier, dispersants or other complementary agents in a convenient manner such as by milling.

The zinc salts of this invention, in addition to being excellent fungicides, may be used as vulcanization accelerators.

The following specific, but merely illustrative, examples will further contribute to an understanding of the invention. In the examples, the parts are expressed as parts by weight.

*Examples*

(1) Sixty-eight and three tenths (68.3) parts of 85% ethylene diamine (about 1 mol) were dissolved in 650 parts of water and 81.4 parts of zinc oxide (1 mol) were stirred into the solution. As soon as 91.2 parts of carbon disulfide (1.2 mols) had been introduced into the mixture, the temperature begins to rise, whereby a tough paste was formed. When a temperature of 40° C. was reached, the reaction mixture was initially cooled and later warmed slightly to maintain this temperature. The thick paste was soon transformed into an easily stirrable precipitate. After continuing the reaction for three hours, the reaction mass was heated for a brief period to 50° C. Then the precipitate was drawn off by suction, and rinsed with water. After drying at 45° C., a fine, slightly yellowish powder in a yield of 206 parts was obtained which corresponded to 95% of theoretical. It contained 30.8% S and 12.9% N, in a mol ratio of ethylene diamine to carbon disulfide of 1:1 and also 30.5% zinc.

(2) To an aqueous mixture of 71.5 parts of 84% ethylene diamine (1 mol) with 71 parts of manganous oxide (1 mol), 84 parts carbon disulfide (1.1 mols) was added. After vigorous stirring, for five hours at a temperature of 40° C., the reaction mixture was heated for 30 minutes to 50° C. After cooling, and filtering off the reaction product and drying it 202 parts of a product were obtained containing 25.3% S and 10.5% N.

(3) Forty-nine (49) parts of zinc oxide and 35 parts of manganous oxide were stirred into 71.5 parts of 84% ethylene diamine and 500 ml. of water and then 83 parts of carbon disulfide were added. Slow exothermic heat of reaction resulted in the formation of a thick paste. The reaction was continued for two hours at 40° C. and thereafter heated briefly to 50° C. The reaction product was easily separated by suction. After drying at a temperature of 45° C., a linden-green, fine powder was obtained in a yield of 206 parts. Upon analysis the product was found to contain 10.7% Mn, 25.5% S, 12.9% N and 13.9% Zn.

The mol ratio of ethylene diamine to carbon disulfide in the reaction product was 1.15:1.

Various modifications and variations in the specific embodiments of the invention disclosed in the examples will occur to those skilled in the art which are within the spirit and scope of the invention as defined in the claims.

What is claimed is:

1. A process for producing heavy metal salts of beta-aminoethyl dithiocarbamic acid, which comprises vigorous mixing with an aqueous solution of (*a*) ethylene diamine, (*b*) carbon disulfide and (*c*) a heavy metal oxide selected from the group consisting of zinc oxide, manganous oxide and a mixture of zinc oxide and manganous oxide thereby directly reacting (*a*), (*b*) and (*c*) in said aqueous solution to form the respective corresponding heavy metal salts of beta-aminoethyl dithiocarbamic acid; the carbon disulfide and said heavy metal oxide being introduced respectively in molar proportions with respect to the ethylene diamine between 0.9 and 2 and between 0.5 and 1.5.

2. The process of claim 1 wherein the reaction medium is free of compounds forming water soluble salts.

3. The process of claim 1 wherein the reaction takes place at a temperature between 20 and 50° C.

4. The process of claim 1 wherein the heavy metal salt is mixed into the aqueous solution of the ethylene diamine and carbon disulfide then is introduced into the formed mixture.

5. A fungicide, a zinc salt of beta-aminoethyl dithiocarbamic acid.

6. A fungicide, a manganous salt of beta-aminoethyl dithiocarbamic acid.

7. A fungicide, a mixture of zinc and manganous salts of beta-aminoethyl dithiocarbamic acid.

References Cited in the file of this patent

UNITED STATES PATENTS

| | | |
|---|---|---|
| 2,356,764 | Kern | Aug. 29, 1944 |
| 2,406,960 | Neal | Sept. 3, 1946 |
| 2,545,948 | Flenner | Mar. 20, 1951 |
| 2,693,485 | Gobeil | Nov. 2, 1954 |
| 2,792,327 | Hunt | May 14, 1957 |
| 2,797,181 | Drexel | June 25, 1957 |
| 2,855,418 | Mugnier | Oct. 7, 1958 |
| 2,882,291 | Harman | Apr. 14, 1959 |
| 2,895,980 | Harman | July 21, 1959 |

FOREIGN PATENTS

| | | |
|---|---|---|
| 174 | Great Britain | Sept. 30, 1909 |
| 795,142 | Great Britain | May 14, 1958 |